US009596209B2

(12) United States Patent
Theogaraj et al.

(10) Patent No.: US 9,596,209 B2
(45) Date of Patent: Mar. 14, 2017

(54) CAUSING CLIENT DEVICE TO REQUEST A NEW INTERNET PROTOCOL ADDRESS BASED ON A LINK LOCAL ADDRESS

(71) Applicant: Aruba Networks, Inc., Sunnyvale, CA (US)

(72) Inventors: Isaac Theogaraj, Bangalore (IN); Rajalakshmi Manoharan, Bangalore (IN)

(73) Assignee: Aruba Netwroks, Inc., Sunnyvale, CA (US)

( * ) Notice: Subject to any disclaimer, the term of this patent is extended or adjusted under 35 U.S.C. 154(b) by 291 days.

(21) Appl. No.: 14/517,249

(22) Filed: Oct. 17, 2014

(65) Prior Publication Data
US 2016/0112370 A1 Apr. 21, 2016

(51) Int. Cl.
 G06F 15/16 (2006.01)
 H04L 29/12 (2006.01)
(52) U.S. Cl.
 CPC ...... H04L 61/2015 (2013.01); H04L 61/2053 (2013.01); H04L 61/2092 (2013.01)
(58) Field of Classification Search
 CPC ............. H04L 61/2015; H04L 61/2053; H04L 61/2092
 See application file for complete search history.

(56) References Cited

U.S. PATENT DOCUMENTS

| | | | | |
|---|---|---|---|---|
| 2002/0112058 A1* | 8/2002 | Weisman | ............. | G06F 9/4411 709/227 |
| 2009/0055517 A1* | 2/2009 | Kao | .................... | H04L 29/1232 709/221 |
| 2010/0023617 A1* | 1/2010 | Tremaine | .......... | H04L 29/12264 709/224 |
| 2012/0173646 A1* | 7/2012 | Lan | ........................ | H04L 12/56 709/206 |
| 2015/0312208 A1* | 10/2015 | Chatterjee | ........... | H04L 61/2015 709/245 |
| 2016/0036772 A1* | 2/2016 | Pratapa | ............... | H04L 61/2061 709/245 |
| 2016/0112452 A1* | 4/2016 | Guevin | ................. | H04L 61/103 726/1 |

* cited by examiner

*Primary Examiner* — Mohamed Wasel
(74) *Attorney, Agent, or Firm* — Brooks, Cameron & Huebsch, PLLC (57) ABSTRACT

The present disclosure discloses a method and a network device for causing client devices to renew DHCP IP addresses based on link local addresses. Specifically, the network device provides for detecting that a wireless client device has been self-assigned with an automatic IP address, and for de-authenticating the wireless client device such that the wireless client device restarts the authentication process and the DHCP process subsequently without excessive delay. In particular, the network device may receive a packet from a wireless client device. The network device then determines that a source or destination IP address of a received packet corresponding to the wireless client device is a link local IP address. Responsive to determining that the source IP address is a link local IP address, the network device transmits at least one message that causes the wireless client device to request a new IP address.

15 Claims, 7 Drawing Sheets

CAUSING CLIENT DEVICE TO REQUEST A NEW INTERNET PROTOCOL ADDRESS BASED ON A LINK LOCAL ADDRESS

FIELD

Embodiments of the present disclosure relate to Dynamic Host Configuration Protocol (DHCP) wireless client address managements. In particular, embodiments of the present disclosure describe a method and network device for causing client devices to renew DHCP IP addresses based on link local addresses.

BACKGROUND

In some network deployments, wireless client devices (e.g., Windows® client) fail to obtain a dynamic host configuration protocol (DHCP) address due to temporary issues. In such scenarios, a wireless client device may decide to self-assign an automatic Internet Protocol (IP) address (e.g., 169.254.X.X). As such, the wireless client devices with the automatic IP address can only communicate within Layer-2 domains, but cannot communicate in Layer-3 domains, because a router is typically programmed to drop a packet having a source IP address that is automatically generated with 169.254.X.X.

Wireless client devices often encounter the above-mentioned DHCP issues intermittently. If a client device tries to renew the IP address at a later time, the client might obtain a valid IP address. There may be a few reasons for the client device's initial failure to obtain a valid DHCP IP address. First, a temporary glitch may have occurred in the network causing a packet loss. For example, in a classroom when all students come for a class and their client devices associate with the network during the same period of time, a few of the client devices might encounter packet losses due to temporary network congestion. Those few client devices may fall back to use automatic IP addresses. Second, a temporary DHCP server failure may have occurred. Third, the DHCP lease may be temporarily unavailable.

Some client devices have mechanisms to retransmit network requests for DHCP IP address assignment in the event of a failure. For example, a Windows® client device will typically retransmit DHCP requests for three times. Specifically, the client device may send the first retry message after 4 seconds, the next retry message after 8 seconds, and the last retry message after 16 seconds. This mechanism leads to roughly 28 seconds before falling to a self-assigned automatic IP address. This process can be repeated after 30 seconds and/or every 6 minutes or so thereafter. Nevertheless, there is no existing mechanism that allows the client device to re-initiate the DHCP IP address requesting process faster upon an initial failure to obtain a valid DHCP IP address by the client device.

Therefore, client devices may benefit from an intervening mechanism to help them receive valid DHCP IP addresses in cases of an initial failed attempt. This will improve overall network customer experience.

DETAILED DESCRIPTION

In the following description, several specific details are presented to provide a thorough understanding. While the context of the disclosure is directed to DHCP client management in wireless local area networks, one skilled in the relevant art will recognize, however, that the concepts and techniques disclosed herein can be practiced without one or more of the specific details, or in combination with other components, etc. In other instances, well-known implementations or operations are not shown or described in details to avoid obscuring aspects of various examples disclosed herein. It should be understood that this disclosure covers all modifications, equivalents, and alternatives falling within the spirit and scope of the present disclosure.

BRIEF DESCRIPTION OF THE DRAWINGS

The present disclosure may be best understood by referring to the following description and accompanying drawings that are used to illustrate embodiments of the present disclosure.

Overviews

Embodiments of the present disclosure relate to Dynamic Host Configuration Protocol (DHCP) wireless client address managements. In particular, embodiments of the present disclosure describe a method and network device for causing client devices to renew DHCP IP addresses based on link local addresses.

With the solution provided herein, a network device receives a packet from a wireless client device. The network device then determines that a source IP address of the packet, received from the wireless client device, is a link-local address. Responsive to determining that the source IP address is a link-local address, the network device transmits at least one message that causes the wireless client device to request a new IP address.

Specifically, embodiments of the present disclosure provide a method and system for detecting that a client device has been assigned with an automatic IP address, and for de-authenticating the client device such that the client device restarts the authentication process and the DHCP process subsequently without excessive delay.

Automatic IP self-assignment by a client device can be detected at datapath by a network device (e.g., a network controller). Specifically, when a client device uses a self-assigned automatic IP address for link local communications, such as Link Local Multicast Name Resolution (LLMNR), other Layer-2 multicast traffic will follow soon. Thus, some packets having self-assigned automatic IP address as source address are expected to be detected immediately.

After the datapath of a network controller detects that an automatic IP address is used as a source address in a packet, the network controller can send a trigger message to a station management (STM) process. The STM process then sends a dis-associate message to the corresponding client device upon receiving the trigger message from the datapath. Meanwhile, the STM process also sends a "station down" event to an authentication (AUTH) process. The AUTH process will then remove the user entry in the station table as well as the corresponding user entry in the datapath. Thus, the particular user entry corresponding to the client device having the automatic IP address will be completely deleted by the network controller, and the client device will be forced to re-associate with the same service set identifier (SSID) again.

Ideally, the client device shall be required to re-initiate the DHCP handshake communication exchanges. Conventional DHCP does not provide any mechanism to force a client device to re-initiate DHCP handshake communication exchanges quickly. However, when de-authentication occurs, it is likely that the client device can obtain a valid DHCP IP address soon.

Typically, the network device only needs to require repeated DHCP process for only a few client devices. This is because only a few client devices may face these issues. And we can repeat DHCP process a few times (e.g., three times) with some backoff (i.e., incremental intervals to each subsequent DHCP retry message).

This mechanism could be implemented as a knob or an event handling mechanism. Also, the network controller can throttle the rate of DHCP retry process. Even though this mechanism involves additional packet exchanges because of de-authentication and increased processing at the network controller, it is important to note that this mechanism would help client devices to obtain DHCP IP address faster.

Network Computing Environment

Figure 1:
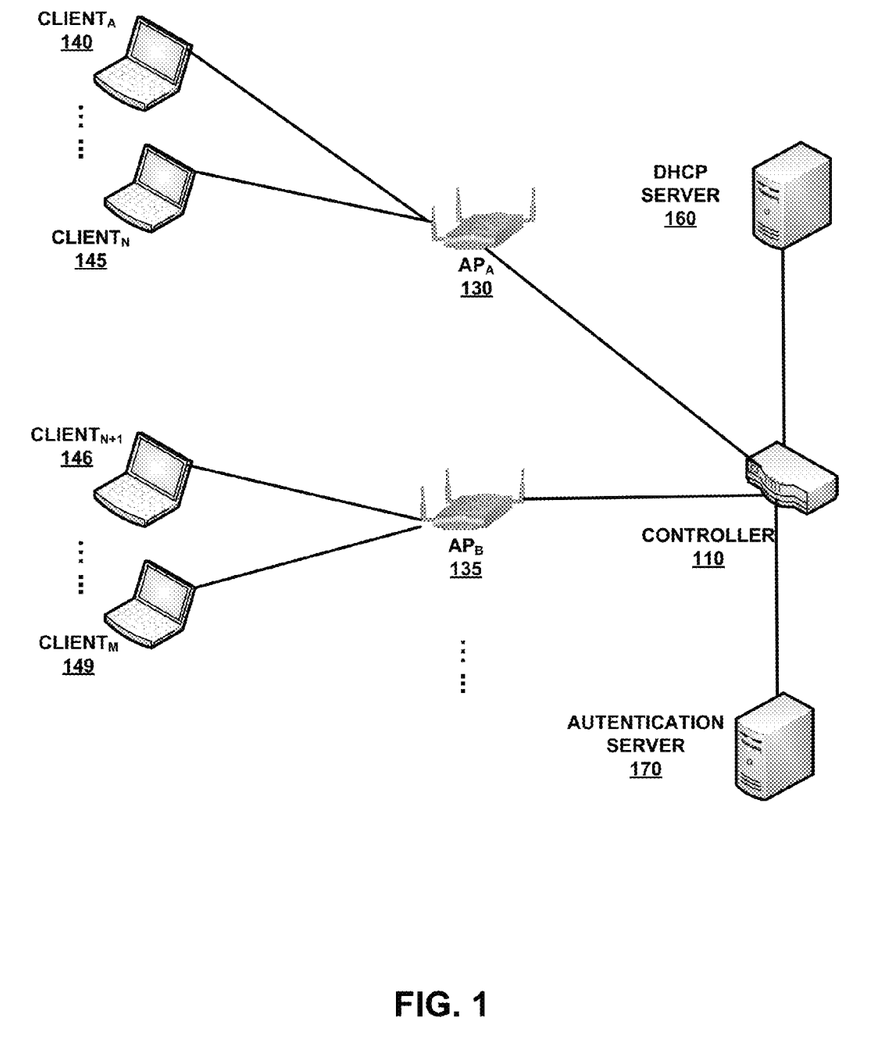
FIG. 1 shows an exemplary network environment according to embodiments of the present disclosure.

FIG. 1 shows an exemplary network environment according to embodiments of the present disclosure. Specifically, FIG. 1 illustrates a network that includes at least a DHCP server 160, an authentication server 170, a network controller 110, a number of access points (APs) (such as, $AP_A$ 130 and $AP_B$ 135), and a plurality of client devices, such as $Client_A$ 140, . . . , $Client_N$ 145, $Client_{N+1}$ 146, . . . , $Client_M$ 149, etc.

Network controller 110 generally refers to a controlling device that manages other network devices such as wireless access points. Network controller 110 may handle automatic adjustments to radio frequency power, wireless channels, wireless authentication, and/or security. Furthermore, network controller 110 can be combined to form a wireless mobility group to allow inter-controller roaming. Network controller 110 can be part of a mobility domain to allow clients access throughout large or regional enterprise facility locations. This saves the clients time and administrators overhead because it can automatically re-associate or re-authenticate.

Access points, e.g., $AP_A$ 130 and $AP_B$ 135, generally refer to a set of wireless network devices that allow wireless client devices to connect to a wired network using IEEE 802.11 or related standards. The APs usually connect to a router via a wired network, but can also be an integral component of the router itself.

DHCP server 160 receives requests for IP addresses from client devices, and configures a plurality of networking parameters (including an IP address) automatically for the client devices, thereby reducing the need for a network administrator or a user to configure these settings manually.

Dynamic Host Configuration Protocol (DHCP) is a standardized networking protocol used on Internet Protocol (IP) networks for dynamically distributing network configuration parameters, such as IP addresses for interfaces and services.

A typical DHCP handshake communication exchange includes one or more of the following operations: (1) DHCP DISCOVER; (2) DHCP OFFER; (3) DHCP REQUEST; and (4) DHCP ACK.

First, a client device (e.g., $Client_A$ 140) can broadcast a DHCP DISCOVER message on a sub-network using the destination address 255.255.255.255 or the specific subnet broadcast address. A DHCP client device (e.g., $Client_A$ 140) may also request to renew its last-known IP address assigned by DHCP server 160.

Next, when DHCP server 160 receives a DHCP DISCOVER message from a client device (e.g., $Client_A$ 140), which is an IP address lease request, DHCP server 160 reserves an IP address for the client device (e.g., $Client_A$ 140), and makes a lease offer by sending a DHCP OFFER message to the client device (e.g., $Client_A$ 140).

DHCP OFFER message includes at least the client device's identifier (e.g., $Client_A$ 140's Media Access Control (MAC) address), the IP address that DHCP server 160 is offering, the subnet mask, the lease duration, the IP address of DHCP server 160 making the offer, etc.

In response to the DHCP OFFER message, the client device (e.g., $Client_A$ 140) replies with a DHCP REQUEST message, a broadcast message to the server requesting the offered address. Note that, a client device (e.g., $Client_A$ 140) can receive DHCP OFFER messages from multiple servers, but the client device (e.g., $Client_A$ 140) will accept only one DHCP OFFER. Based at least on server identifiers in the DHCP REQUEST message, DHCP servers are informed whose offer the client device (e.g., $Client_A$ 140) has accepted.

When DHCP server 160 receives DHCP REQUEST message from the client device (e.g., $Client_A$ 140), DHCP server 160 sends a DHCP ACK message to the client device (e.g., $Client_A$ 140). The DHCP ACK message includes at least the lease duration, and configuration information that the client device might have requested.

In addition, other DHCP operations between the client device (e.g., $Client_A$ 140) and DHCP server 160 may include a DHCP INFORMATION message and a DHCP RELEASE message. A DHCP client device may request more information than what DHCP server 160 sent with the original DHCP OFFER message via DHCP INFORMATION message. The client device (e.g., $Client_A$ 140) may also send DHCP INFORMATION message to request repeat data for a particular application. Moreover, the client device (e.g., $Client_A$ 140) sends a DHCP RELEASE message to DHCP server 160 to release the DHCP INFORMATION and the client device (e.g., $Client_A$ 140) subsequently deactivates its IP address. Note that, the DHCP protocol does not mandate client devices to send DHCP RELEASE messages. The IP assignment for a DHCP client device will expire after a predetermined period of time if the DHCP client device fails to renew the IP address prior to the expiration time of the IP address.

Authentication server 170 generally refers to a server that provides authentication for users that connect and use a network service. For example, Remote Authentication Dial In User Service (RADIUS) is an exemplary networking protocol that provides centralized Authentication, Authorization, and Accounting (AAA) management for network users.

Specifically, a client device sends an authentication request to gain access to a particular network resource using access credentials. The credentials may be passed to an intermediary network device (e.g., a remote access server or a network controller). The intermediary network device sends an Access Request message to RADIUS server (e.g., Authentication server 170), requesting authorization to grant access via the RADIUS protocol. The Access Request can include access credentials, typically in the form of username and password or security certificate provided by the user. Additionally, the Access Request may include any other information which the network device knows about the user.

Authentication server 170 (e.g., a RADIUS server) then checks that the information is correct using authentication schemes, such as PAP, CHAP or EAP. Authentication server 170 then verifies the user's proof of identification. Depending on the result of verification process, authentication server 170 returns an authentication response. For example, a RADIUS server can return one of three responses to the network device: (1) Access Reject, (2) Access Challenge, or (3) Access Accept. An Access Reject message indicates that the user is unconditionally denied access to all requested network resources. An Access Challenge message requests additional information from the user, such as a secondary password, PIN, token, or card. An Access Accept message grants access to the user.

Each access point serves one or more client devices. For illustration purposes only, assuming that, in FIG. 1, a plurality of client devices, such as $Client_A$ 140, . . . , $Client_N$ 145, initially associate with $AP_A$ 130. Moreover, assuming that when each of the client devices associates with $AP_A$ 130, network controller 110 assigns each client device to $VLAN_1$. Therefore, when a client device, e.g., $Client_A$ 140, sends a DHCP request, $AP_A$ 130 will forward the request to DHCP server 160 based on the corresponding VLAN assignment to $Client_A$ 140.

Next, DHCP server 160 will assign an available IP address to $Client_A$ 140 upon receiving the DHCP request. The available IP address will be selected from an address pool that is reserved for $VLAN_1$ and maintained by DHCP server 160. In some scenarios, a client device (e.g., $Client_A$ 140) may not receive a valid DHCP IP address assignment from DHCP server 160. As a result, a client device (e.g., $Client_A$ 140) may decide to self-assign an automatic Internet Protocol (IP) address, which is typically in the format of 169.254.X.X with IPv4. Note that, the client device (e.g., $Client_A$ 140) with the automatic IP address can only communicate within Layer-2 domains, but cannot communicate in Layer-3 domains.

There may be a few reasons for the client device's initial failure to obtain a valid DHCP IP address. First, a temporary glitch may have occurred in the network causing a packet loss. Second, a temporary DHCP server failure may have occurred. Third, the DHCP lease may be temporarily unavailable. If a client device (e.g., $Client_A$ 140) tries to renew the IP address at a later time, the client device (e.g., $Client_A$ 140) might obtain a valid IP address from DHCP server 160.

Automatic IP Self-Assignment

Figure 2:
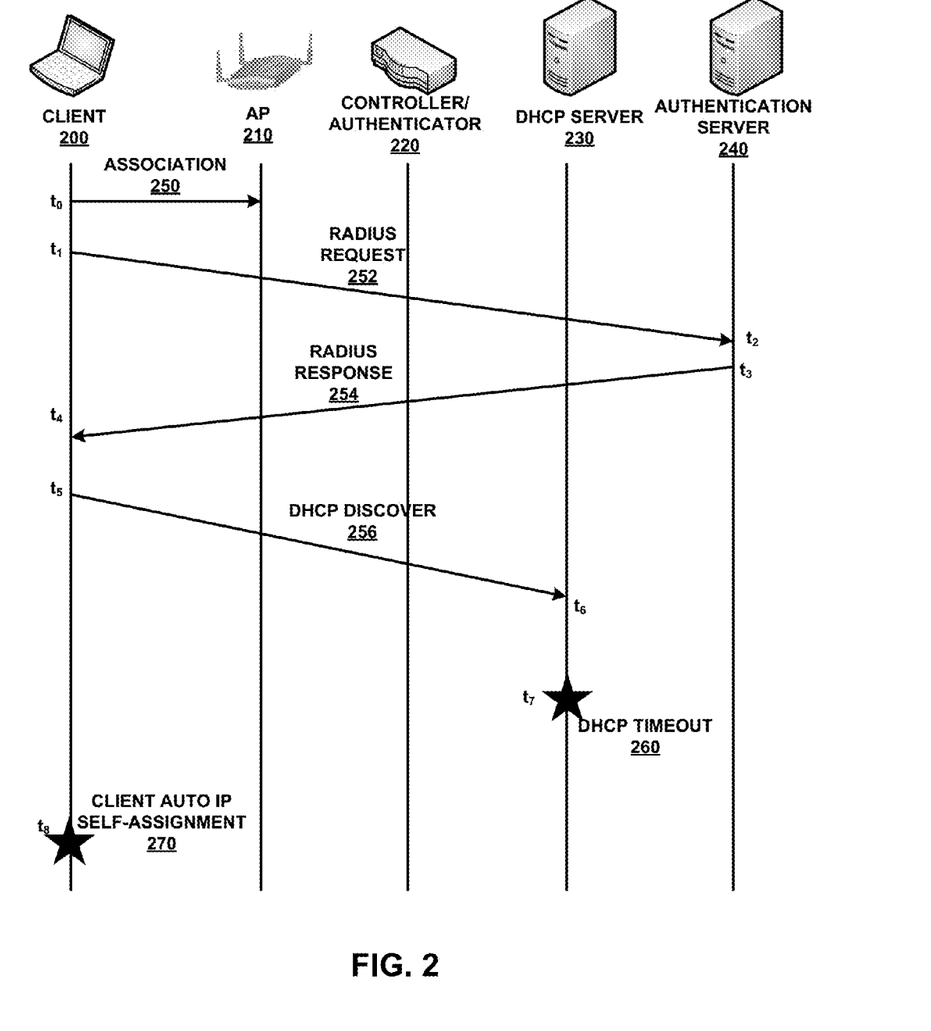
FIG. 2 shows an exemplary sequence diagram illustrating network communication exchanges according to embodiments of the present disclosure.

FIG. 2 shows an exemplary sequence diagram illustrating network communication exchanges according to embodiments of the present disclosure. Specifically, FIG. 2 illustrates a network that includes at least a client device 200, an AP 210, a network controller and/or authenticator 220, a DHCP server 230, and an authentication server 240.

At time point $t_0$, client device 200 initiates an association 250 with an access point (AP 210) in a wireless local area network (WLAN). In order to be authenticated by the WLAN, at time point $t_1$, client device 200 sends an authentication request (e.g., RADIUS Request 252), which is received by authentication server 240 at time point $t_2$. Thereafter, at time point $t_3$, authentication server 240 sends an authentication response (e.g., RADIUS Response 254) to client device 200, which is received by client device 200 at time point $t_4$. Here, for illustration purposes only, assuming that RADIUS Response 254 indicates that client device 200 has been granted access to the WLAN. Next, at time point $t_6$, client device 200 sends a DHCP DISCOVER message 256 to the WLAN.

DHCP DISCOVER message 256 is a broadcast message, and is received by DHCP server 230 at time point $t_6$. For a number of previously mentioned reasons, DHCP server 230 may be temporarily unavailable to assign an IP address to client device 200, or the response from DHCP server 230 may not be able to reach client device 200. Here, for illustration purposes only, assuming that DHCP server 230 is busy during the period of time following time point $t_6$, and thus unable to assign the IP address to client device 200. Thus, at time point $t_7$, client device 200's DHCP request 256 reach the DHCP timeout 260. Hence, at time point $t_8$, because client device 200 fails to receive an IP address from DHCP server 230, client device 200 gets an automatic IP self-assignment 270. The self-assigned automatic IP address will be in the format of 169.254.X.X. Client device 200 will not be able to have WLAN connectivity, because the automatic IP address cannot be routed in layer-3 domains.

Note that, in this scenario, client device 200 will be self-assigned with an automatic IP address even though DHCP server 230 is no longer in busy mode after time point $t_7$ with at least one valid IP address that can be assigned to client device 200 properly. Such scenario frequently occurs when a large number of users attempt to connect to the same network at the same time. For example, when a large number of students try to connect to the same network in the same classroom with their laptops at the beginning of the class. The majority of the students will connect to the network successfully. However, a few students may not be able to connect due to temporary network packet loss or DHCP server unavailability.

Detection of Automatic IP Self-Assignment

Conventionally, if a client device fails to obtain a valid DHCP IP address, a user and/or a network administrator will need to renew the DHCP IP address manually to re-initiate the DHCP handshake communications in order to obtain a valid DHCP IP address. In a large network, this manual task can become very cumbersome for the network administrator.

Embodiments of the present disclosure allow for detection of automatic IP self-assignment by a network device. Once a client device (e.g., client device 200) self-assigns an automatic IP address (e.g., 169.254.2.3), the client device will immediately transmit a broadcast message, for example, DNS based queries. The broadcast message will have the automatic IP address (e.g., 169.254.2.3) as the source IP address. As previously mentioned, with an automatic IP address, the client device only has minimal network privileges. In particular, the client device can only communicate with other client devices or network devices within the same Layer-2 network domain and cannot communicate with any other devices on the WLAN.

The datapath of the network controller will then receive the broadcast message from the client device shortly. Then, the datapath will parse the received broadcast message to determine whether the source IP address in the broadcast message is a link local address. Specifically, the datapath can determine whether the source IP address falls within the range of 169.254.1.1 and 169.254.255.255. This determination will not add any additional performance cost for the datapath because every network message received at a network controller will need to go through firewall lookups, which requires determination of the source and/or destination IP address in the received message.

Causing Client Device to Renew DHCP IP Address

Figure 3:
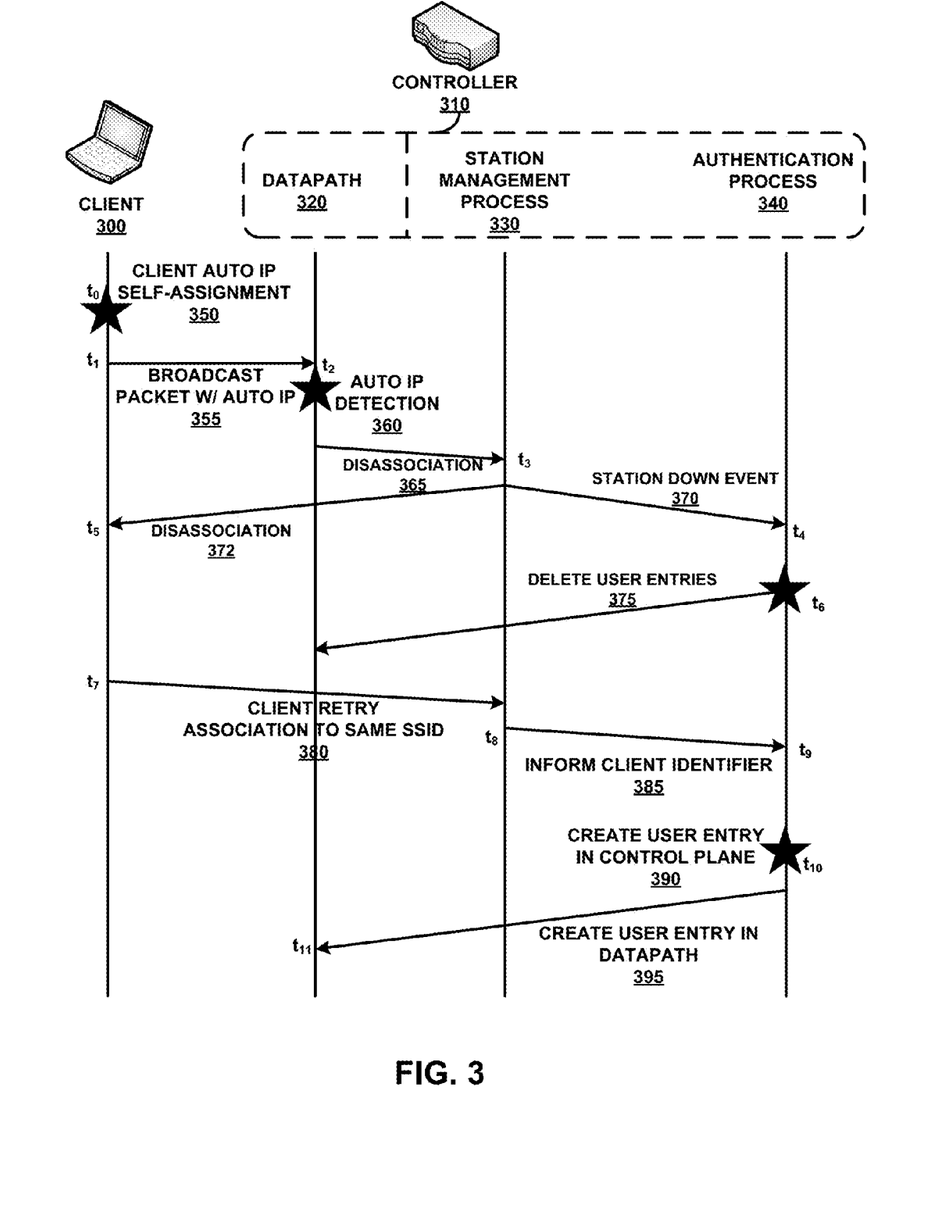
FIG. 3 shows an exemplary sequence diagram illustrating communication exchanges for causing client devices to renew DHCP IP addresses according to embodiments of the present disclosure.

FIG. 3 shows an exemplary sequence diagram illustrating communication exchanges for causing client devices to renew DHCP IP addresses according to embodiments of the present disclosure. FIG. 3 includes at least a client device 300 and a network controller 310. Network controller 310 further includes at least a data plane and a control plane. Specifically, the data plane includes datapath 320; the control plane includes at least a station management (STM) process 330 and an authentication (AUTO) process 340.

Each process in the data plane and/or control plane corresponds to a unique process identifier. An inter-process communication mechanism exists to allow datapath 320, station management (STM) process 330, and authentication (AUTH) process 340 to communicate with each other using the process identifiers and a pre-specified communication protocol.

At time point $t_0$, client device 300 fails to obtain a valid DHCP IP address, thereby completes a client automatic IP address self-assignment 350. Shortly after, at time point $t_1$, client device 300 transmits a broadcast packet 355, which has the self-assigned automatic IP address as source IP address. Broadcast packet with automatic IP address 355 is received by datapath 320 at network controller 310 at time point $t_2$. Thus, datapath 320 immediately detects the automatic IP address used in broadcast packet 355. Upon automatic IP address detection 360, datapath 320 will send a disassociation message 365 to station management (STM) process 330 in the control plane of network controller 310. After receiving disassociation message 365 at time point $t_3$, station management (STM) process 330 will then send a disassociation message 372 to client device 300, causing client device 300 to disassociate with the network. Disassociation message 372 is subsequently received by client device 300 at time point $t_5$.

In addition, upon receiving disassociation message 365 from datapath 320, station management (STM) process 330 will also trigger a station down event 370, which is transmitted to an authentication (AUTH) process 340 in the control plane at network controller 310. After receiving station down event 370 at time point $t_4$, authentication (AUTH) process 340 deletes a corresponding user entry for client device 300 in the control path at time point $t_6$. Moreover, authentication (AUTH) process 340 also deletes the corresponding user entry for client device 300 in datapath 320.

When a client device (e.g., client device 300) associates with a particular extended service identifier (ESSID) that a particular access point (AP) has broadcasted, station management (STM) process 330 receives an association message from the client device (e.g., client device 300), and informs authentication (AUTH) process 340 that the client device has joined the particular ESSID. Thereafter, authentication (AUTH) process 340 will create the Layer-2 user entry for the client device (e.g., client device 300) in the control plane.

Moreover, authentication (AUTH) process 340 will perform a basic validity check to ensure that the IP address is valid for the corresponding subnet mask, and then insert a copy of the same user entry to the datapath 320. Any addition, deletion, and/or modification operation of the user entries can be performed exclusively by authentication (AUTH) process 340. When an automatic IP address is self-assigned by client device 300, the validity check by authentication (AUTH) process 340 will mark the access control lists (ACLS) corresponding to client device 300's user entry. The ACLS will indicate that client device 300 only has limited network privileges because of the use of an automatic IP address by client device 300.

When a particular user entry is deleted in the datapath and the control plane, the corresponding client device (e.g., client device 300) is forced to immediately associate with the same extended service set identifier (ESSID) broadcasted by the same AP that client device 300 was previously connected to. An access point (AP) may broadcast multiple ESSIDs. However, client device 300 will attempt to be connected to the same ESSID after receiving disassociation message 372 from station management (STM) process 320. Furthermore, if client device 300 fails to connect to the same ESSID, client device 300 will retry the connection to the same ESSID a few times. Note that, existing DHCP mechanisms lack effective ways to force client device 300 to re-initiate the DHCP handshake communication exchanges immediately after a failure to obtain DHCP IP address. Here, client device 300 will re-initiate the DHCP handshake communication exchanges after being disassociated with the network and fully de-authenticated by network controller 310.

Thus, as illustrated in FIG. 3, at time point $t_7$, client device 300 will retransmit an association message 380 to the same ESSID. After client device 300 transmit association message 380, client device 300 will request a new DHCP IP address. After station management (STM) process 330 receives the association message 380 from client device 300, at time point $t_8$, station management (STM) process 330 informs authentication (AUTH) process 340 of client identifier 380, e.g., client device 300's Media Access Control (MAC) address. Authentication (AUTH) process 340 receives the notification from station management (STM) process at time point $t_9$. Next, because neither Layer-2 nor Layer-3 user entry corresponding to client device 300 exists in the control plane and/or datapath, authentication (AUTH) process 340 creates user entry in control plane 390 at time point $t_{10}$. Also, authentication (AUTH) process 340 creates a copy of the user entry in datapath 395 at time point $t_{11}$.

In some embodiments, station management (STM) process 330 maintains a hash table that includes the MAC addresses of client devices and the number of times that each client device has been issued a disassociation message by network controller 310. If the number of times corresponding to a particular client device exceeds a threshold value, network controller 310 will stop sending disassociation message to the particular client device.

Moreover, in some embodiments, network controller 310 may incrementally back off the time interval that it waits before sending out the next disassociation message to the same client device. For example, network controller 310 may immediately send the first disassociation message 372 to client device 300 after automatic IP detection 360 at datapath 320. If client device 300 fails to obtain a valid DHCP IP address again after retrying association to the same ESSID 380 and re-assigns another automatic IP address to itself, network controller 310 will wait for a short period of time (e.g., 3 seconds) before transmitting the second disassociation message to client device 300. If client device 300 still fails to obtain a valid DHCP IP address and self-assigns a third automatic IP address, network controller 310 will exponentially back off, e.g., by waiting for 9 seconds before transmitting the third disassociation message to client device 300. Network controller 310 may be configured to send a maximum of three disassociation messages. Thus, network controller 310 will stop sending disassociation messages to client device 300 after transmitting the third disassociation message to client device 300, even if client device 300 still fails to obtain a valid DHCP IP address.

Processes for Causing Client Device to Renew DHCP IP Address

Figure 4:
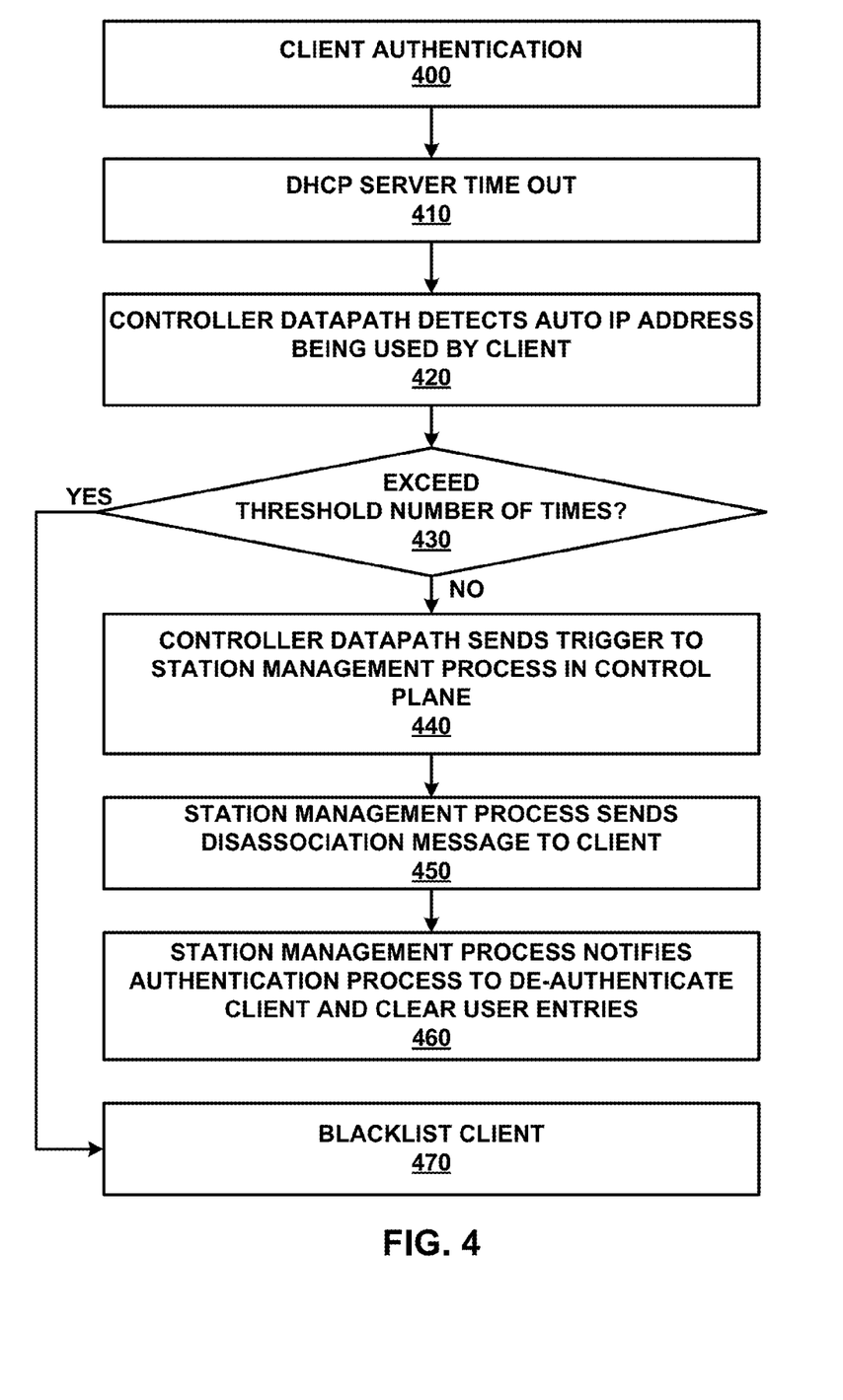
FIG. 4 shows an exemplary process for causing client devices to renew DHCP IP addresses according to embodiments of the present disclosure.

FIG. 4 illustrates a detailed exemplary process for causing a client device to renew DHCP IP address according to embodiments of the present disclosure. During operations, a client device initiates client authentication to a network (operation 400). Following client authentication 400, client device may also initiate DHCP communication exchange to obtain a valid DHCP IP address. Next, DHCP server times out (operation 410), for example, due to packet loss and/or network congestion. Thereafter, client device may self-assign an automatic IP address and use the self-assigned automatic IP address for network communications. Subsequently, a network controller datapath detects that an automatic IP address is being used by the client device (operation 420). Then, the network controller determines whether the number of times that the network controller sent disassociation message to the client device has exceeded a threshold number of times (operation 430). If so, the network controller will blacklist the client device (operation 470) and stop sending disassociation messages to the client device. Otherwise, the network controller datapath sends a trigger to station management process in the control plane (operation 440). Then, the station management process sends a disassociation message to the client device (operation 450). Moreover, the station management process also notifies an authentication process in the control plane to de-authenticate the client device and clear corresponding user entries in both control plane and datapath (operation 460).

Figure 5A:
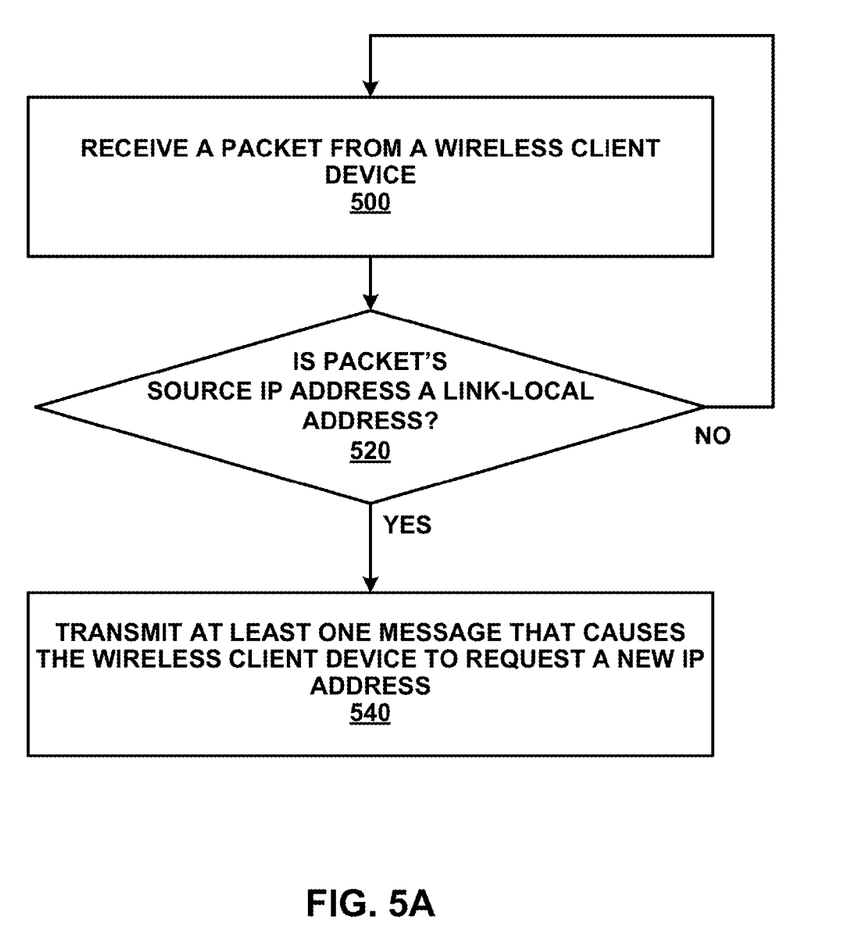
FIG. 5A-5B show other exemplary processes for causing client devices to renew DHCP IP addresses according to embodiments of the present disclosure.
Figure 5B:
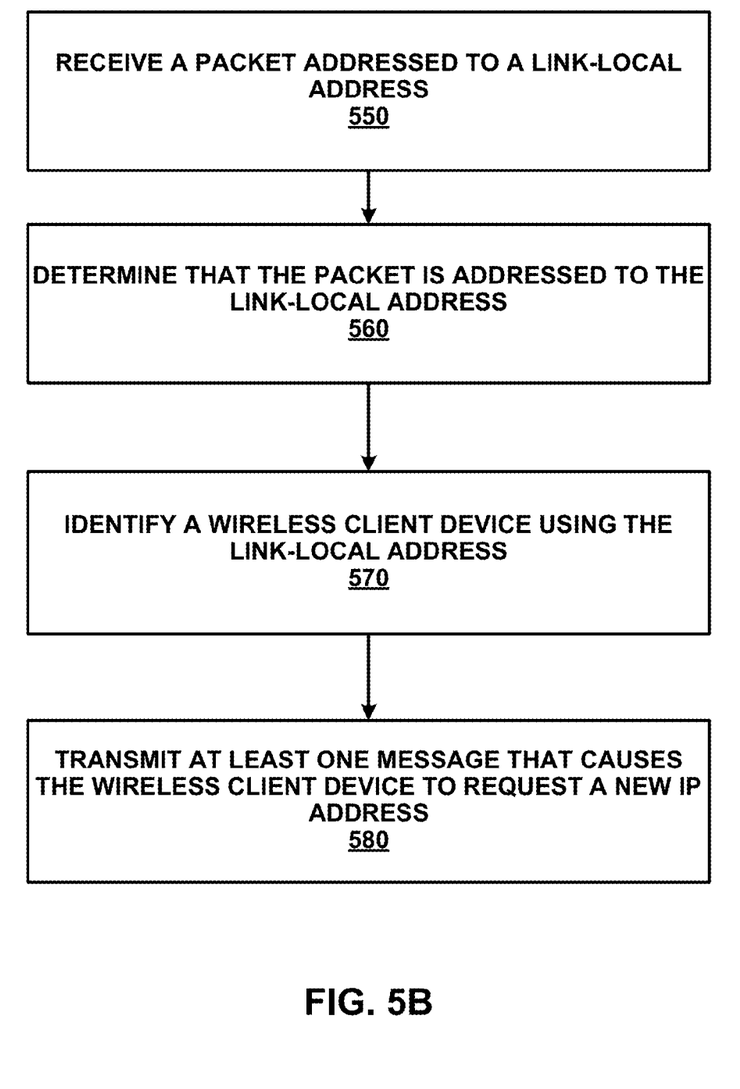

FIGS. 5A-5B illustrate other exemplary processes for causing a client device to renew DHCP IP address according to embodiments of the present disclosure. Referring to FIG. 5A, during operations, a network device receives a packet from a wireless client device (operation 500). Next, the network device determines whether the packet's source IP address is a link local address (operation 520). If so, the network device transmits at least one message that causes the wireless client device to request a new IP address (operation 540) from DHCP server in the network. If not, the network device repeats operation 500.

Referring now to FIG. 5B, during operations, a network device receives a packet addressed to a link local address (operation 550). Next, the network device determines that the packet is addressed to the link local address (operation 560). Then, the network device identifies a wireless client device using the link local address (operation 570). Finally, the network device transmits at least one message that causes the wireless client device to request a new IP address (operation 580). Note that, the link local address is used by the wireless client device in response to the wireless client device not being able to reach a DHCP server.

In some embodiments, the network device determines that the source IP address or the destination IP address of the received packet is a link-local address. Specifically, the network device determines that the source IP address and/or the destination address is 169.254.X.Y, whereas 'X' and 'Y' are any numbers in a range from 0 to 255.

In some embodiments, the at least one message includes a De-Association message and/or a De-Authentication message. The De-Association message can be sent to the wireless client device. Moreover, the De-Authentication message is transmitted to a second network device storing authentication information corresponding to the wireless client device.

In some embodiments, transmitting at least one message that causes the wireless client device to request a new IP address is responsive to determining that a number of times the client has been caused to request a new IP address is less than a threshold value.

In some embodiments, the network device further maintains a list of wireless client devices that have been caused to request a new IP address. The network device will track the number of times that a particular wireless client device has been caused to request the new IP address. If it exceeds a threshold value, the network device will stop causing the particular wireless client device to request the new IP address. Moreover, the network device may incrementally or exponentially increased the time interval that it waits before causing the particular wireless client device to request the new IP address again after a failed attempt.

In some embodiments, the network device causes the client device to de-associate from a particular Extended Service Set Identifier (ESSID) corresponding to an access point.

In some embodiments, where the network adopts an IPv6 protocol, the network device can receive one or more packets from a wireless client device, and determine that at least one packet from the wireless client device does not correspond to any network response. Responsive to the number of packets from the wireless client device that do not correspond to any network responses exceeds a threshold value, the network device will transmit at least one message that causes the wireless client device to request a new IP address. Here, the at least one message transmitted by the network device may include a De-Association message sent to the wireless client device. Moreover, the one or more packets received by the network controller may include a DHCP solicit message and/or a DHCP request message.

System for Causing Client Device to Renew DHCP IP Address

Figure 6:
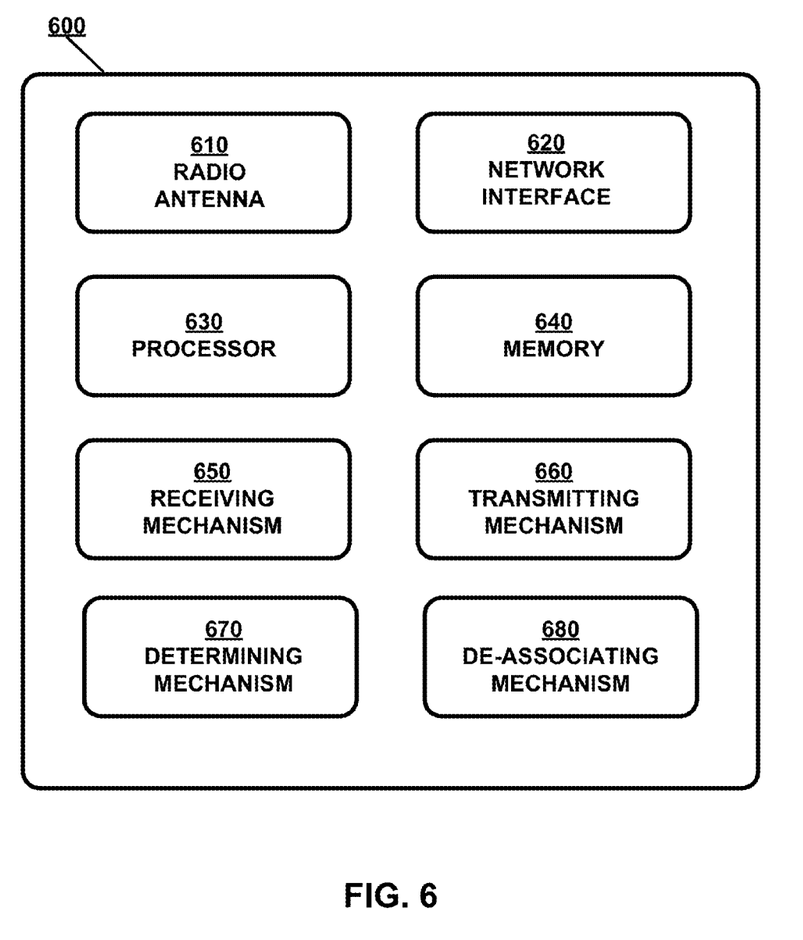
FIG. 6 is a block diagram illustrating an exemplary system for causing client devices to renew DHCP IP addresses according to embodiments of the present disclosure.

FIG. 6 is a block diagram illustrating a system for causing a client device to renew a DHCP IP address according to embodiments of the present disclosure. Network device 600 includes at least one or more radio antennas 610 capable of either transmitting or receiving radio signals or both, a network interface 620 capable of communicating to a wired or wireless network, a processor 630 capable of processing computing instructions, and a memory 640 capable of storing instructions and data. Moreover, network device 600 further includes a receiving mechanism 650, a transmitting mechanism 660, a determining mechanism 670, and a de-associating mechanism 680, all of which are in communication with processor 630 and/or memory 640 in network device 600. Network device 600 may be used as a client system, or a server system, or may serve both as a client and a server in a distributed or a cloud computing environment.

Radio antenna 610 may be any combination of known or conventional electrical components for receipt of signaling, including but not limited to, transistors, capacitors, resistors, multiplexers, wiring, registers, diodes or any other electrical components known or later become known.

Network interface 620 can be any communication interface, which includes but is not limited to, a modem, token ring interface, Ethernet interface, wireless IEEE 802.11 interface, cellular wireless interface, satellite transmission interface, or any other interface for coupling network devices.

Processor 630 can include one or more microprocessors and/or network processors.

Memory 640 can include storage components, such as, Dynamic Random Access Memory (DRAM), Static Random Access Memory (SRAM), etc. Specifically, memory 640 can maintain a list of wireless client devices that have been caused to request a new IP address.

Receiving mechanism 650 generally receives one or more network messages via network interface 620 or radio antenna 610 from a wireless client device. The received network messages may include, but are not limited to, requests and/or responses, beacon frames, management frames, control path frames, and so on.

Specifically, in some embodiments, receiving mechanism 650 receives a packet from a wireless client device that is self-assigned with a link local address or automatic IP address. In some embodiments, receiving mechanism 650 receives a packet addressed to a link local address. In some embodiments, receiving mechanism 650 receives one or more packets from a wireless client device in an IPv6 network. The one or more packets may include, but are not limited to, a DHCP solicit message and a DHCP request message.

Transmitting mechanism 660 generally transmits messages, which include, but are not limited to, requests and/or responses, beacon frames, management frames, control path frames, and so on. Specifically, transmitting mechanism 660 can transmit at least one message that causes the wireless client device to request a new IP address in response to determining mechanism 670 determining that the source IP address and/or the destination IP address is a link local address (or an automatic IP address).

In some embodiments, the at least one message includes both a De-Association message and a De-Authentication message. In some embodiments, the at least one message includes only a De-Association message sent to the wireless client device. In some embodiments, the at least one message includes only a De-Authentication message. Further, the de-authentication message can be transmitted to a second network device storing authentication information corresponding to the wireless client device.

In some embodiments, transmitting mechanism 660 transmits the at least one message that causes the wireless client device to request a new IP address further in response to determining mechanism 670 determining that a number of times the client has been caused to request a new IP address is less than a threshold value.

In some embodiments, transmitting mechanism 660 transmits the at least one message that causes the wireless client device to request a new IPv6 address in response to the number of packets from the wireless client device that do not correspond to any network responses exceeding a threshold value. Here, the at least one message includes a De-Association message sent to the wireless client device.

Determining mechanism 670 generally determines whether a source IP address or a destination IP address of a received packet is a link local address. In some embodiments, determining mechanism 670 determines that the source IP address is 169.254.X.Y, whereas 'X' and 'Y' are any numbers in a range from 0 to 255. Note that, the link local address is used by the wireless client device in response to the wireless client device not being able to reach a DHCP server.

In some embodiments, responsive to determining mechanism 670 determining that the packet is addressed to a particular link local IP address, determining mechanism 670 further identifies a wireless client device using the particular link local IP address.

In some embodiments, determining mechanism 670 determines that at least one packet from the wireless client device does not correspond to any network response, for example, in an IPv6 network where all client devices use link local addresses.

De-associating mechanism 680 generally causes a wireless client device to request a new IP address. Specifically, de-associating mechanism 680 can cause the wireless client device to de-associate from a particular Extended Service Set Identifier (ESSID) corresponding to an access point.

The present disclosure may be realized in hardware, software, or a combination of hardware and software. The present disclosure may be realized in a centralized fashion in one computer system or in a distributed fashion where different elements are spread across several interconnected computer systems coupled to a network. A typical combination of hardware and software may be an access point with a computer program that, when being loaded and executed, controls the device such that it carries out the methods described herein.

The present disclosure also may be embedded in non-transitory fashion in a computer-readable storage medium (e.g., a programmable circuit; a semiconductor memory such as a volatile memory such as random access memory "RAM," or non-volatile memory such as read-only memory, power-backed RAM, flash memory, phase-change memory or the like; a hard disk drive; an optical disc drive; or any connector for receiving a portable memory device such as a Universal Serial Bus "USB" flash drive), which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

As used herein, "network device" generally includes a device that is adapted to transmit and/or receive signaling and to process information within such signaling such as a station (e.g., any data processing equipment such as a computer, cellular phone, personal digital assistant, tablet devices, etc.), an access point, data transfer devices (such as network switches, routers, controllers, etc.) or the like.

As used herein, "access point" (AP) generally refers to receiving points for any known or convenient wireless access technology which may later become known. Specifically, the term AP is not intended to be limited to IEEE 802.11-based APs. APs generally function as an electronic device that is adapted to allow wireless devices to connect to a wired network via various communications standards.

As used herein, the term "interconnect" or used descriptively as "interconnected" is generally defined as a communication pathway established over an information-carrying medium. The "interconnect" may be a wired interconnect, wherein the medium is a physical medium (e.g., electrical wire, optical fiber, cable, bus traces, etc.), a wireless interconnect (e.g., air in combination with wireless signaling technology) or a combination of these technologies.

As used herein, "information" is generally defined as data, address, control, management (e.g., statistics) or any combination thereof. For transmission, information may be transmitted as a message, namely a collection of bits in a predetermined format. One type of message, namely a wireless message, includes a header and payload data having a predetermined number of bits of information. The wireless message may be placed in a format as one or more packets, frames or cells.

As used herein, "wireless local area network" (WLAN) generally refers to a communications network that links two or more devices using some wireless distribution method (for example, spread-spectrum or orthogonal frequency-division multiplexing radio), and usually providing a connection through an access point to the Internet; and thus, providing users with the mobility to move around within a local coverage area and still stay connected to the network.

As used herein, the term "mechanism" generally refers to a component of a system or device to serve one or more functions, including but not limited to, software components, electronic components, electrical components, mechanical components, electro-mechanical components, etc.

As used herein, the term "embodiment" generally refers an embodiment that serves to illustrate by way of example but not limitation.

It will be appreciated to those skilled in the art that the preceding examples and embodiments are exemplary and not limiting to the scope of the present disclosure. It is intended that all permutations, enhancements, equivalents, and improvements thereto that are apparent to those skilled in the art upon a reading of the specification and a study of the drawings are included within the true spirit and scope of the present disclosure. It is therefore intended that the following appended claims include all such modifications, permutations and equivalents as fall within the true spirit and scope of the present disclosure.

While the present disclosure has been described in terms of various embodiments, the present disclosure should not be limited to only those embodiments described, but can be practiced with modification and alteration within the spirit and scope of the appended claims. Likewise, where a reference to a standard is made in the present disclosure, the reference is generally made to the current version of the standard as applicable to the disclosed technology area. However, the described embodiments may be practiced under subsequent development of the standard within the spirit and scope of the description and appended claims. The description is thus to be regarded as illustrative rather than limiting.

What is claimed is:

1. A non-transitory computer readable medium comprising instructions which, when executed by one or more hardware processors, causes performance of operations comprising:
   receiving, by a network device, a packet from a wireless client device;
   determining that a source IP address of the packet, received from the wireless client device, is a link-local address used in response to the wireless client device not being able to reach a DHCP server; and
   responsive to determining that the source IP address is a link-local address, transmitting at least one message that causes the wireless client device to request a new IP address, wherein the at least one message comprises a De-Association message sent to the wireless client device to cause the wireless client device to request the new IP address.

2. The non-transitory computer readable medium of claim 1, wherein determining that the source IP address is a link-local address comprises determining that the source IP address is 169.254.X.Y, wherein 'X' and 'Y' are any numbers in a range from 0 to 255.

3. The non-transitory computer readable medium of claim 1, wherein the at least one message comprises a De-Authentication message.

4. The non-transitory computer readable medium of claim 3, wherein the de-authentication message is transmitted to a second network device storing authentication information corresponding to the wireless client device.

5. The non-transitory computer readable medium of claim 1, wherein transmitting at least one message that causes the wireless client device to request a new IP address is further responsive to determining that a number of times the client has been caused to request a new IP address is less than a threshold value.

6. The non-transitory computer readable medium of claim 1, wherein the operations further comprise maintaining a list of wireless client devices that have been caused to request a new IP address.

7. The non-transitory computer readable medium of claim 1, wherein causing the wireless client device to request a new IP address comprises causing the client device to de-associate from a particular Extended Service Set Identifier (ESSID) corresponding to an access point.

8. A non-transitory computer readable medium comprising instructions which, when executed by one or more hardware processors, causes performance of operations comprising:
   receiving, by a network device, a packet addressed to a link-local address;
   responsive to determining that the packet is addressed to the link-local address;
   identifying a wireless client device using the link-local address, wherein the link-local address is used by the wireless client device in response to the wireless client device not being able to reach a DHCP server;
   transmitting at least one message that causes the wireless client device to request a new IP address, wherein the at least one message comprises a De-Association message sent to the wireless client device.

9. The non-transitory computer readable medium of claim 8, wherein determining that the packet is addressed to the link-local address comprises determining that the destination IP address of the packet is 169.254X.Y., wherein 'X' and 'Y' are any numbers in a range from 0 to 255.

10. The non-transitory computer readable medium of claim 1, wherein the at least one message further comprises a De-Authentication message.

11. The non-transitory computer readable medium of claim 8, wherein transmitting at least one message that causes the wireless client device to request a new IP address is further responsive to determining that a number of tires the client has been caused to request a new IP address is less than a threshold value.

12. The non-transitory computer readable medium of claim 8, wherein the operations further comprise maintaining a list of wireless client devices that have been caused to request a new IP address.

13. The non-transitory computer readable medium of claim 8, wherein causing the wireless client device to request a new IP address comprises causing the client device to de-associate from a particular Extended Service Set Identifier (ESSTD) corresponding to an access point.

14. A non-transitory computer readable medium comprising instructions which, when executed by one or more hardware processors, causes performance of operations comprising.

15. The non-transitory computer readable medium of claim 14, wherein the one or more packets comprise a DHCP solicit message and a DHCP request message.

\* \* \* \* \*